(12) United States Patent
Srikanthan et al.

(10) Patent No.: US 11,716,384 B2
(45) Date of Patent: Aug. 1, 2023

(54) DISTRIBUTED RESOURCE MANAGEMENT BY IMPROVING CLUSTER DIVERSITY

(71) Applicant: Huawei Technologies Co., Ltd., Shenzhen (CN)

(72) Inventors: Sharanyan Srikanthan, Rochester, NY (US); Zongfang Lin, Santa Clara, CA (US); Chen Tian, Palo Alto, CA (US); Ziang Hu, Union City, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/302,585

(22) Filed: May 6, 2021

(65) Prior Publication Data

US 2021/0273996 A1 Sep. 2, 2021

Related U.S. Application Data

(63) Continuation of application No. PCT/CN2019/091342, filed on Jun. 14, 2019.
(Continued)

(51) Int. Cl.
*H04L 67/1097* (2022.01)
*H04L 67/00* (2022.01)
*H04L 67/50* (2022.01)

(52) U.S. Cl.
CPC .......... *H04L 67/1097* (2013.01); *H04L 67/34* (2013.01); *H04L 67/535* (2022.05)

(58) Field of Classification Search
None
See application file for complete search history.

(56) References Cited

U.S. PATENT DOCUMENTS

| 2005/0021530 | A1* | 1/2005 | Garg | G06F 9/505 |
| 2012/0017218 | A1* | 1/2012 | Branson | G06F 9/505 |
| | | | | 718/104 |

(Continued)

FOREIGN PATENT DOCUMENTS

| CN | 103338241 A | 10/2013 |
| CN | 103530185 A | 1/2014 |

(Continued)

OTHER PUBLICATIONS

"International Application No. PCT/CN2019/091342, International Search Report and Written Opinion dated Jul. 25, 2019", (Jul. 25, 2019), 6 pgs.

*Primary Examiner* — Mohamed A. Wasel
*Assistant Examiner* — Mohammad Yousuf A. Mian
(74) *Attorney, Agent, or Firm* — Schwegman Lundberg & Woessner, P.A.

(57) ABSTRACT

A method of distributed resource management in a distributed computing system includes determining usage of respective hardware resources by an application and generating usage metrics for the application, and assigning the application to a cluster of hardware resources to optimize diversity of usage of hardware resources in the cluster and to enhance utilization of the hardware resources by applications running in that cluster. The diversity of usage of the hardware resources is determined from respective usage metrics of the respective applications running in that cluster. The diversity of usage of the hardware resources in the cluster is optimized by assigning the application to a diversity pool of hardware resources adapted to minimize interference when applications assigned to the diversity pool of hardware resources access the hardware resources in the diversity pool and assigning applications from different diversity pools to the cluster of hardware resources.

20 Claims, 4 Drawing Sheets

Related U.S. Application Data (60) Provisional application No. 62/769,596, filed on Nov. 20, 2018.

(56) References Cited

U.S. PATENT DOCUMENTS

| | | |
|---|---|---|
| 2013/0166751 A1 | 6/2013 | Wu et al. |
| 2014/0282582 A1* | 9/2014 | Clark ................... G06F 9/4806 |
| | | 718/104 |
| 2016/0110198 A1* | 4/2016 | Bertran ............... G06F 11/3414 |
| | | 712/228 |
| 2017/0039236 A1* | 2/2017 | Li ......................... G06F 16/245 |
| 2017/0078372 A1* | 3/2017 | Gao ...................... G06F 9/5016 |
| 2017/0351593 A1* | 12/2017 | Gay ................... G06F 11/3024 |
| 2018/0316626 A1* | 11/2018 | Tian ...................... H04L 47/803 |

FOREIGN PATENT DOCUMENTS

| | | |
|---|---|---|
| CN | 104391749 A | 3/2015 |
| CN | 104834569 A | 8/2015 |
| CN | 105975340 A | 9/2016 |
| WO | WO-2020103440 A1 | 5/2020 |

* cited by examiner

FIG. 1

| APPLICATION CHARACTERISTICS | MEMORY BOUND | CPU PIPELINE BOUND | DISK BOUND | CACHE COHERENCE BOUND |
|---|---|---|---|---|
| APPLICATION NAME | M1, M2, M3 | C1, C2, C3 | D1, D2, D3 | CC1, CC2 |

FIG. 2

| NODE 1 | NODE 2 | NODE 3 | NODE 4 | NODE 5 | NODE 6 |
|---|---|---|---|---|---|
| C1, C2 | C3, M1 | M2, M3 | D1, D2 | D3, CC1 | CC2 |

FIG. 3

| NODE 1 | NODE 2 | NODE 3 | NODE 4 | NODE 5 | NODE 6 |
|---|---|---|---|---|---|
| M1, C1, D1 | M1, C2, D1 | M2, CC1, D2 | M2, CC1, D2 | ME, CC2, C3, D3 | M3, CC2, C3, D3 |

DISTRIBUTED RESOURCE MANAGEMENT BY IMPROVING CLUSTER DIVERSITY

CROSS-REFERENCE TO RELATED APPLICATIONS

This application is a continuation application of International Application No. PCT/CN2019/091342, filed Jun. 14, 2019, which claims the benefit of priority to U.S. Provisional Application No. 62/769,596, filed on Nov. 20, 2018, entitled "Distributed Resource Management by Improving Cluster Diversity," the benefit of priority of each of which is claimed herein, and which applications and publication are hereby incorporated herein by reference in their entirety.

TECHNICAL FIELD

This application is directed to parallel and distributed computing and is particularly directed to improving resource management in distributed resource clusters without penalizing application performance in data centers and distributed resource clusters by identifying and increasing the diversity of low level resources used by applications.

BACKGROUND

Resource Management (RM) is a technique to map resources with limited availability to users and application frameworks. In the cloud, RM refers to management of computing, network and storage resources on large clusters or data centers. The profitability of data centers directly depends on utilization of individual computing nodes. However, most data centers and large clusters of hardware components have very low utilization levels (<50%) and often operate at a fraction of their processing capacities. Data centers and clouds that host multiple applications from the same tenant or different ones typically suffer from low resource utilization that increases energy costs and reduces profit margins. Low resource utilization is usually a side effect of isolating applications to prevent reduction in performance due to other co-running applications or a lack of understanding of the application itself and its performance needs.

Different resource management systems have been proposed to address such resource management issues. Some RM systems dedicate to a specific framework the handling of different jobs or user requests (scheduling) while other RM systems try to handle more than one framework that is frequently invoked. In either case, RM systems typically seek to optimize the function and performance of the systems using the managed resources. Function management relates to resource accounting that has been performed at a coarse-grained level. Such management rarely targets fundamental hardware and application inefficiencies. Similarly, performance management typically involves the system making the resource allocation decisions, not the underlying framework. Moreover, some RM systems focus on CPU/memory access and do not assign applications to maximize diversity of use of low level resources within a machine or hardware cluster because the RM systems generally are not aware of the application's hardware usage characteristics. As a result, RM systems typically allocate applications to resources based on CPU and memory scheduling at a high level, without optimizing the efficiency of the use of other system resources.

Failure to optimize the efficiency of use of low level hardware resources is problematic as application performance primarily depends on the efficient use of multiple hardware modules such as pipelines, caches, busses, memory bandwidths, etc., that are not directly allocated to different applications since they are shared amongst all the applications that use a given machine. Different applications rely on using different hardware modules to minimize interference for good performance. However, allocating applications strictly to minimize interference in access to hardware resources fails to optimize the use of the underlying hardware resources.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

It is desired to develop a distributed resource management system that packs together applications in the same cluster of hardware components where the applications have different characteristics with respect to demand for low level resources by determining at least one of a cache coherence, memory bandwidth, multi-level cache performance, processor bus performance, processor pipeline performance, cache bandwidth, cache hit rate, and non-uniform memory access latencies and assigning applications so as to increase diversity of demand on these resources. The system and method described herein prioritizes low level resource diversity and packs applications into machines such that the applications assigned to a given machine use different low-level resources with the goal that all possible low-level resources that can be used will be used.

A first aspect relates to a computer-implemented method of distributed resource management in a distributed computing system by prioritizing hardware resource diversity. The method includes the steps of determining usage of respective hardware resources by an application to generate usage metrics and assigning the application to a cluster of hardware resources to optimize diversity of usage of the hardware resources in the cluster and to enhance utilization of hardware resources by applications running in that cluster. In sample embodiments, diversity of usage of the hardware resources in the cluster is determined from respective usage metrics of the respective applications running in that cluster. Such a method improves overall resource utilization and efficiency without sacrificing the performance of applications themselves. Such a method also increases resource utilization of hardware clusters and data centers, reduces the average latency for application execution, reduces energy usage and increases cost savings since time spent per application is reduced. Such improvements in efficiency have large implications on the energy and costs of data centers, making them more affordable, profitable, and greener.

In a first implementation form according to the first aspect as such, determining usage of the respective hardware resources by the application comprises using a hardware performance counter to determine usage of the respective hardware resource by the application to generate the usage metrics.

In a second implementation form according to the first aspect or any preceding implementation form of the first aspect, determining usage of respective hardware resources by the application to determine the usage metrics is performed when the application is running offline.

In a third implementation form according to the first aspect as such or any preceding implementation form of the first aspect, determining usage of respective hardware resources by the application to determine the usage metrics is performed in real time as the application is being executed by the hardware resources.

In a fourth implementation of the first aspect, the method further includes characterizing the respective hardware resources using micro-benchmarking to identify performance critical hardware resources.

In a fifth implementation form according to the first aspect as such or any preceding implementation form of the first aspect, assigning the application to a cluster of hardware resources to optimize diversity of usage of the hardware resources in the cluster comprises extrapolating hardware resources required by the application to the capability of each hardware resource and using a fairness algorithm to assign the application to a diversity pool of hardware resources to maximize the diversity of usage of the hardware resources in the diversity pool based on the usage metrics.

In a sixth implementation form according to the first aspect as such or any preceding implementation form of the first aspect, assigning the application to a cluster of hardware resources to optimize diversity of usage of the hardware resources in the cluster comprises assigning the application to a diversity pool of hardware resources adapted to minimize interference when applications assigned to the diversity pool of hardware resources access the hardware resources in the diversity pool, and assigning applications from different diversity pools to the cluster of hardware resources.

In a seventh implementation form according to the first aspect as such or any preceding implementation form of the first aspect, assigning the application to a cluster of hardware resources to optimize diversity of usage of the hardware resources in the cluster comprises sorting the application and other applications into diversity pools of hardware resources using the fairness algorithm.

In an eighth implementation form according to the first aspect as such or any preceding implementation form of the first aspect, assigning the application to a cluster of hardware resources to optimize diversity of usage of the hardware resources in the cluster comprises selecting a least diverse cluster of hardware resources and assigning applications from respective diversity pools to the least diverse cluster of hardware resources for processing.

In a ninth implementation form according to the first aspect as such or any preceding implementation form of the first aspect, the method further includes determining performance of modules of hardware resources by determining at least one of a cache coherence, memory bandwidth, multi-level cache performance, processor bus performance, processor pipeline performance, cache bandwidth, cache hit rate, and non-uniform memory access latencies.

A second aspect relates to an apparatus for providing distributed resource management in a distributed computing system by prioritizing hardware resource diversity. The apparatus includes at least one hardware performance counter that generates usage metrics for respective hardware resources used by an application and a resource manager that assigns the application to a cluster of hardware resources based on the usage metrics so as to optimize diversity of usage of the hardware resources in the cluster and to enhance utilization of hardware resources by applications running in that cluster. In sample embodiments, diversity of usage of the hardware resources in the cluster is determined from respective usage metrics of the respective applications running in that cluster. Such an apparatus improves overall resource utilization and efficiency without sacrificing the performance of applications themselves. Such an apparatus also increases resource utilization of hardware clusters and data centers, reduces the average latency for application execution, reduces energy usage and increases cost savings since time spent per application is reduced.

In a first implementation form according to the second aspect as such, determining usage of the respective hardware resources by the application comprises using a hardware performance counter to determine usage of the respective hardware resource by the application to generate the usage metrics.

In a second implementation form according to the second aspect as such or any preceding implementation form of the second aspect, determining usage of respective hardware resources by the application to determine the usage metrics is performed when the application is running offline.

In a third implementation form according to the second aspect as such or any preceding implementation form of the second aspect, determining usage of respective hardware resources by the application to determine the usage metrics is performed in real time as the application is being executed by the hardware resources.

In a fourth implementation form according to the second aspect as such or any preceding implementation form of the second aspect, the method further includes characterizing the respective hardware resources using micro-benchmarking to identify performance critical hardware resources.

In a fifth implementation form according to the second aspect as such or any preceding implementation form of the second aspect, assigning the application to a cluster of hardware resources to optimize diversity of usage of the hardware resources in the cluster comprises extrapolating hardware resources required by the application to the capability of each hardware resource and using a fairness algorithm to assign the application to a diversity pool of hardware resources to maximize the diversity of usage of the hardware resources in the diversity pool based on the usage metrics.

In a sixth implementation form according to the second aspect as such or any preceding implementation form of the second aspect, assigning the application to a cluster of hardware resources to optimize diversity of usage of the hardware resources in the cluster comprises assigning the application to a diversity pool of hardware resources adapted to minimize interference when applications assigned to the diversity pool of hardware resources access the hardware resources in the diversity pool, and assigning applications from different diversity pools to the cluster of hardware resources.

In a seventh implementation form according to the second aspect as such or any preceding implementation form of the second aspect, assigning the application to a cluster of hardware resources to optimize diversity of usage of the hardware resources in the cluster comprises sorting the application and other applications into diversity pools of hardware resources using the fairness algorithm.

In an eighth implementation form according to the second aspect as such or any preceding implementation form of the second aspect, assigning the application to a cluster of hardware resources to optimize diversity of usage of the hardware resources in the cluster comprises selecting a least diverse cluster of hardware resources and assigning applications from respective diversity pools to the least diverse cluster of hardware resources for processing.

In a ninth implementation form according to the second aspect as such or any preceding implementation form of the second aspect, the method further includes determining performance of modules of hardware resources by determining at least one of a cache coherence, memory bandwidth, multi-level cache performance, processor bus performance, processor pipeline performance, cache bandwidth, cache hit rate, and non-uniform memory access latencies.

According to a third aspect of the present disclosure, there is provided a non-transitory computer-readable medium storing computer instructions to provide distributed resource management in a distributed computing system by prioritizing hardware resource diversity. The instructions, when processed by one or more processors, implement a method including determining usage of respective hardware resources by an application to generate usage metrics and assigning the application to a cluster of hardware resources based on the usage metrics so as to optimize diversity of usage of the hardware resources in the cluster and to enhance utilization of hardware resources by applications running in that cluster. In sample embodiments, diversity of usage of the hardware resources in the cluster is determined from respective usage metrics of the respective applications running in that cluster. Such a medium improves overall resource utilization and efficiency without sacrificing the performance of applications themselves. Such a medium also increases resource utilization of hardware clusters and data centers, reduces the average latency for application execution, reduces energy usage and increases cost savings since time spent per application is reduced.

In a first implementation form according to the third aspect as such or any preceding implementation form of the third aspect, determining usage of the respective hardware resources by the application comprises using a hardware performance counter to determine usage of the respective hardware resource by the application to generate the usage metrics.

In a second implementation form according to the third aspect as such or any preceding implementation form of the third aspect, determining usage of respective hardware resources by the application to determine the usage metrics is performed when the application is running offline.

In a third implementation form according to the third aspect as such or any preceding implementation form of the third aspect, determining usage of respective hardware resources by the application to determine the usage metrics is performed in real time as the application is being executed by the hardware resources.

In a fourth implementation form according to the third aspect as such or any preceding implementation form of the third aspect, the method further includes characterizing the respective hardware resources using micro-benchmarking to identify performance critical hardware resources.

In a fifth implementation form according to the third aspect as such or any preceding implementation form of the third aspect, assigning the application to a cluster of hardware resources to optimize diversity of usage of the hardware resources in the cluster comprises extrapolating hardware resources required by the application to the capability of each hardware resource and using a fairness algorithm to assign the application to a diversity pool of hardware resources to maximize the diversity of usage of the hardware resources in the diversity pool based on the usage metrics.

In a sixth implementation form according to the third aspect as such or any preceding implementation form of the third aspect, assigning the application to a cluster of hardware resources to optimize diversity of usage of the hardware resources in the cluster comprises assigning the application to a diversity pool of hardware resources adapted to minimize interference when applications assigned to the diversity pool of hardware resources access the hardware resources in the diversity pool, and assigning applications from different diversity pools to the cluster of hardware resources.

In a seventh implementation form according to the third aspect as such or any preceding implementation form of the third aspect, assigning the application to a cluster of hardware resources to optimize diversity of usage of the hardware resources in the cluster comprises sorting the application and other applications into diversity pools of hardware resources using the fairness algorithm.

In an eighth implementation form according to the third aspect as such or any preceding implementation form of the third aspect, assigning the application to a cluster of hardware resources to optimize diversity of usage of the hardware resources in the cluster comprises selecting a least diverse cluster of hardware resources and assigning applications from respective diversity pools to the least diverse cluster of hardware resources for processing.

In a ninth implementation form according to the third aspect as such or any preceding implementation form of the third aspect, the method further includes determining performance of modules of hardware resources by determining at least one of a cache coherence, memory bandwidth, multi-level cache performance, processor bus performance, processor pipeline performance, cache bandwidth, cache hit rate, and non-uniform memory access latencies.

As described in the detailed description below, such apparatus and methods create a mechanism to improve the efficiency of the use of lower level resources by applications assigned to a hardware cluster or a data center.

The method can be performed and the instructions on the computer readable media may be processed by the apparatus, and further features of the method and instructions on the computer readable media result from the functionality of the apparatus. Also, the explanations provided for each aspect and its implementation apply equally to the other aspects and the corresponding implementations. The different embodiments may be implemented in hardware, software, or any combination thereof. Also, any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

It should be understood at the outset that although an illustrative implementation of one or more embodiments are provided below, the disclosed systems and/or methods described with respect to FIGS. 1-6 may be implemented using any number of techniques, whether currently known or in existence. The disclosure should in no way be limited to the illustrative implementations, drawings, and techniques illustrated below, including the example designs and implementations illustrated and described herein, but may be modified within the scope of the appended claims along with their full scope of equivalents.

The systems and methods described herein improve cluster utilization without penalizing application performance in data centers and large hardware clusters by identifying and increasing the diversity of low level resources used by the applications assigned to that cluster. In sample embodiments, the resource manager packs applications together in the same machine or cluster of machines to place multiple types of disparate tasks (e.g., applications that are CPU intensive versus memory access intensive, etc.) in the same machine to improve overall resource utilization and efficiency without sacrificing the performance of applications themselves. This is done by determining usage of respective low-level hardware resources by an application to generate usage metrics and assigning the application to a cluster of hardware resources to optimize diversity of usage of those same hardware resources in the cluster by applications running in that cluster. The diversity of usage of the hardware resources in the cluster is determined from the usage metrics for the respective applications running in that cluster.

To establish such usage metrics, hardware performance counters and micro-benchmark-based characterization of the hardware and applications are used to identify performance critical hardware resources. Such tools may be purchased for testing specific resources or may be developed as custom products for specific hardware resources in a specific hardware cluster. As known by those skilled in the art, a hardware performance counter is a set of special-purpose registers built into a microprocessor to store the counts of hardware-related activities within computer systems. Such counters are typically used to conduct low-level performance analysis or tuning. Each hardware performance counter may be programmed with an index of an event type to be monitored such as an L1 cache miss or a branch error. Software profilers perform similar functions but typically require source code modification, which is generally not desired. Also, some processors use Instruction Based Sampling (IBS) techniques to implement performance counters for both fetch sampling and operations sampling at respective ends of the superscalar pipeline.

Micro-benchmarking, on the other hand, includes running a computer program or set of programs or other operations on a hardware system to assess the relative performance of respective components of the hardware system. The computer program(s) or other operations normally implement a number of standard tests and trials for testing the hardware to determine, for example, performance bounds. Benchmarking is usually associated with assessing performance characteristics such as floating-point operation performance of a CPU, but micro-benchmarking has also been applied to other hardware components and software to enable the performance of various hardware subsystems and basic components to be compared across different chip and system architectures. For example, micro-benchmarking is commonly used for automatic detection of a computer's hardware parameters such as number of registers, cache size, memory latency, etc.

The obtained usage metrics are then used by the resource manager to perform resource allocations that maximize the diversity of usage of the hardware resources by the applications processed by a given node (machine). The assignment of applications to resources can be performed based on usage metrics collected while the application runs offline (such as for familiar applications in private clouds), but the usage metrics may also be collected in real time for new and unpredictable applications and the applications dynamically re-assigned as the applications run. The application may then be assigned or reassigned to a node for processing based on the collected usage metrics.

As a result of such techniques, applications are assigned to machines depending on the machine's different low-level resources. Rather than assigning applications strictly by CPU or memory cycles required, applications may be packed together whose characteristics differ, to ensure that all the low-level resources in the machine are utilized fully.

As used herein, "applications" refer to software applications that require computing system resources to operate. Such computing system resources include the computing system resources that are managed by conventional resources managers, including high level resources such as CPUs, memory capacity, disk quota, etc., as well as lower level resources that determine application performance, including CPU pipeline, cache coherence, memory bandwidth, multi-level caches, processor buses, etc. These lower-level resources are typically shared amongst multiple CPUs and cannot be directly acquired.

Those skilled in the art will recognize that acquiring high-level resources like CPUs and memory cannot guarantee efficiency and performance, particularly with respect to the usage of other computing system resources. The systems and methods described herein address this problem by prioritizing low-level resource diversity when assigning applications to computing system resources whereby all possible low-level resources that can be used will be used.

Enforcing diversity is an aggressive approach to resource management that dedicates expensive hardware resources to specific applications that use them, since satisfying resource requirements is not the same as obtaining performance. Conventional resource management systems that use central scheduling, such as Mesos and Quasar, are modified to assign the applications in accordance with the scalable algorithm described herein to maximize resource diversity as opposed to strictly relying upon CPU and memory scheduling. The algorithm may be made scalable by dividing the machines into sub-clusters for application assignment.

In sample embodiments, an application is assigned to a cluster of hardware resources to optimize diversity of usage of the hardware resources in the cluster by extrapolating hardware resources required by the application to the capability of each hardware resource and using a fairness algorithm (e.g., round-robin or proportionally fair algorithm) to assign the application to a diversity pool of hardware resources to maximize the diversity of usage of the hardware resources in the diversity pool based on the hardware usage metrics of each application. Round-robin algorithms are commonly used by process and network schedulers to assign time slices to each process in equal portions and in circular order so that all processes are handled without priority. Proportionally fair algorithms, on the other hand, is a compromise-based scheduling algorithm that maintains a balance between trying to maximize total throughput while allowing all users (applications) at least a minimum level of service by assigning each application a scheduling priority that is inversely proportional to its anticipated resource consumption. Despite prioritizing hardware utilization and performance, fairness is still guaranteed by imposing limits on the hardware allocation. In different configurations, respective applications can be prioritized differently, hardware can be characterized differently, fairness guarantees can be changed, etc. However, the overall approach still seamlessly works to provide an overall methodology that reduces energy costs and increases performance at the same time by packing applications together to maximize the use of resources.

It will be appreciated that packing applications together based on hardware usage metrics is desirable only for some private clouds and applications since companies may wish to run different applications together and observe compatibility (e.g., non-interference) before committing to the usage-based resource allocation described herein. However, the techniques described herein have the benefit that they can work for public and private clouds without manual experimentation or particular expertise.

Figure 1:
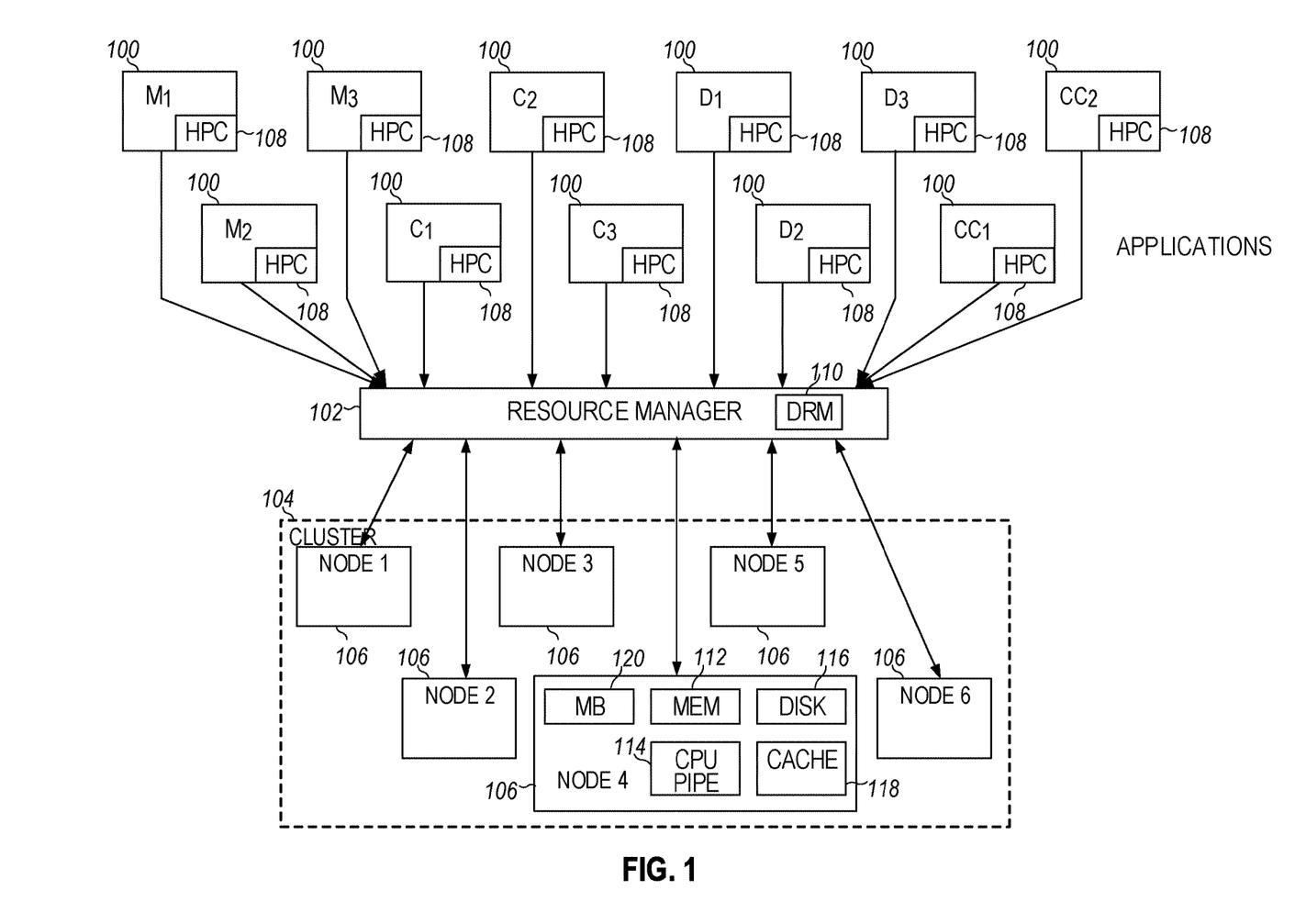
FIG. 1 illustrates a distributed resource management system that distributes applications to a cluster of nodes to increase diversity in a sample embodiment.

FIG. 1 illustrates a distributed resource management system that distributes applications to a cluster of nodes (actual or virtual machines) to increase diversity in a sample embodiment. As illustrated, a plurality of applications 100 are assigned by a resource manager 102 to a cluster 104 of nodes 106. In sample embodiments, a hardware performance counter 108 is associated with each application 100 to measure hardware usage metrics for the low-level resources used by each application 100 and to categorize hardware modules/resources stressed by each application 100. The hardware performance counters 108 may measure the usage metrics of a new and/or unpredictable application in real time as the application runs in cluster 104 and/or the usage metrics may be acquired for familiar applications offline in a private cloud or computer node(s) that simulates the operation of the application in the cluster 104. As further explained below with respect to FIG. 5, the resource manager 102 implements a distributed resource management algorithm 110 to assign the applications 100 to a diversity pool using a fairness algorithm such as a round-robin ordering algorithm where the assignment is based on the usage metrics of each application 100. In a sample embodiment, the usage metrics measure the application's usage of hardware resources of a node such as memory bounds 112, CPU pipeline bounds 114, disk bounds 116, and cache coherence bounds 118. Other usage metrics such as processor pipeline utilization or occupancy, cache bandwidth, cache hit rate, cache pollution, memory bandwidths, non-uniform memory access latencies, coherence traffic, and the like also may be measured in sample embodiments.

Figure 2:
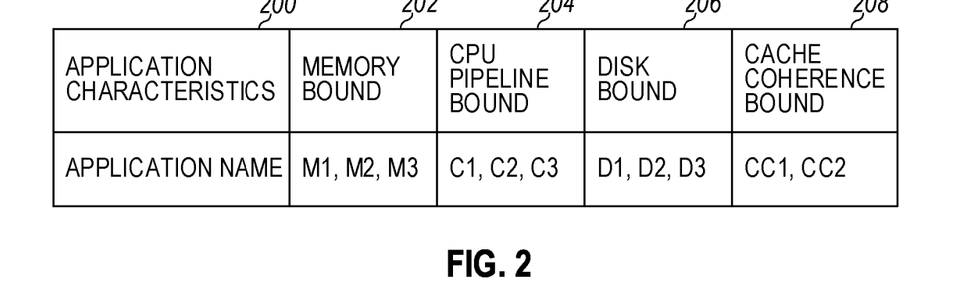
FIG. 2 illustrates a sample set of applications for assignment to a cluster of nodes to increase diversity using the techniques described herein.

To illustrate the operation of the distributed resource management system of FIG. 1, FIG. 2 illustrates a sample set of applications for assignment to the cluster 104 of nodes 106 to increase diversity using the techniques described herein. Table 200 illustrates the application characteristics including memory bound 202, CPU pipeline bound 204, disk bound 206, and cache coherence bound 208 measured for the respective applications 100. As illustrated in table 200, the respective applications 100 are identified as bound by their memory usage characteristics (M1, M2, M3), as bound by their CPU pipeline characteristics (C1, C2, C3), as bound by their disk usage characteristics (D1, D2, D3), or as bound by their cache coherence characteristics (CC1, CC2). Of course, the respective applications may be bound by other low-level hardware characteristics and defined accordingly.

Figure 3:
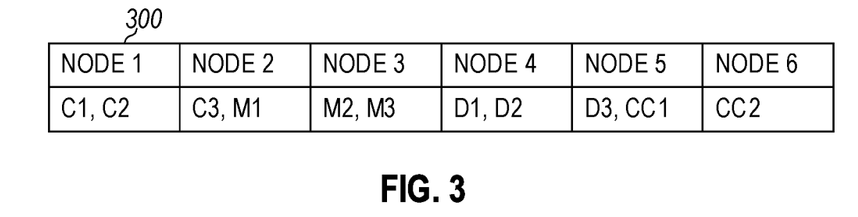
FIG. 3 illustrates a sample assignment of the sample set of applications to the cluster of nodes using conventional fine-grained resource accounting techniques.

FIG. 3 illustrates a sample assignment of the sample set of applications 100 to the cluster 104 of nodes 106 using, for example, conventional fine-grained resource accounting techniques. In the example of FIG. 3, the usage metrics for the low-level resources such as memory bound 202, CPU pipeline bound 204, disk bound 206, and cache coherence bound 208 are not taken into account when assigning the applications 100 to the nodes 106 in the cluster 104 because the conventional resource management system is not aware of such characteristics of the respective applications. Instead, the applications 100 are assigned to the nodes 100 as reflected in table 300 based on usage of high-level resources (e.g., CPU cycles, memory access cycles, etc.). As illustrated in table 300, the respective nodes 106 are assigned the applications 100 irrespective of their bounds for the respective application characteristics, which leads to each machine saturating at different stress levels.

Figure 4:
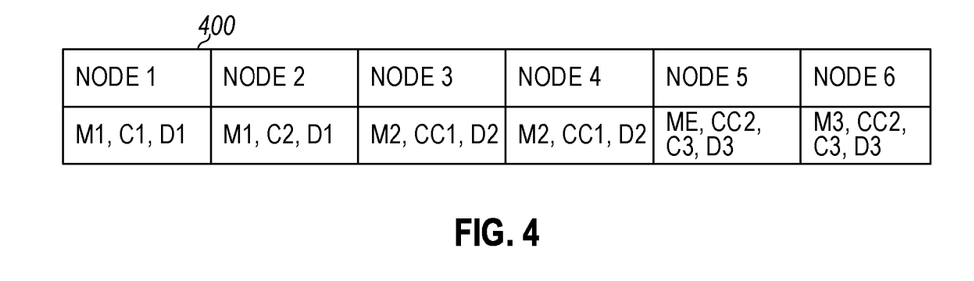
FIG. 4 illustrates a sample assignment of the sample set of applications to the cluster of nodes using a diversity resource management system in accordance with a sample embodiment.

On the other hand, FIG. 4 illustrates a sample assignment of the sample set of applications 100 to the cluster of nodes using a diversity resource management system in accordance with a sample embodiment. In the allocation illustrated in table 400, the applications are assigned to the respective nodes 106 by taking into account the performance characteristics of each application 100 as determined by the hardware performance counters 108 and the hardware characteristics of the respective nodes 106. In particular, the applications 100 are assigned to maximize diversity of the usage of the resources of the respective nodes 106 to avoid the performance bounds of each application 100. In the example allocation in table 400, no node has more than one application with the same type of hardware bound. Generally speaking, the applications 100 are assigned to the respective nodes to maximize such diversity.

Generally, the CPU pipeline is fastest low-level resource. Others are slower and are therefore saturated by less than the number of CPU cores available. This is taken into account when assigning applications 100 to respective nodes (machines) where the assignment of the applications 100 depends on the node's different low-level resources. As in the example of FIG. 4, the applications 100 whose characteristics differ are packed together on the same nodes 106. Limits on resources available to applications 100 on any node 106 is obtained by extrapolating resources required by an application to the hardware capability of the respective nodes, where the hardware capability is characterized using micro-benchmarking software 120 (FIG. 1) that measures each node's maximum capability of usage of a certain resource. As explained below with respect to FIG. 5, the hardware characterization of the respective nodes 106 is also taken into account when assigning the respective applications 100 to nodes 106 for processing.

Figure 5:
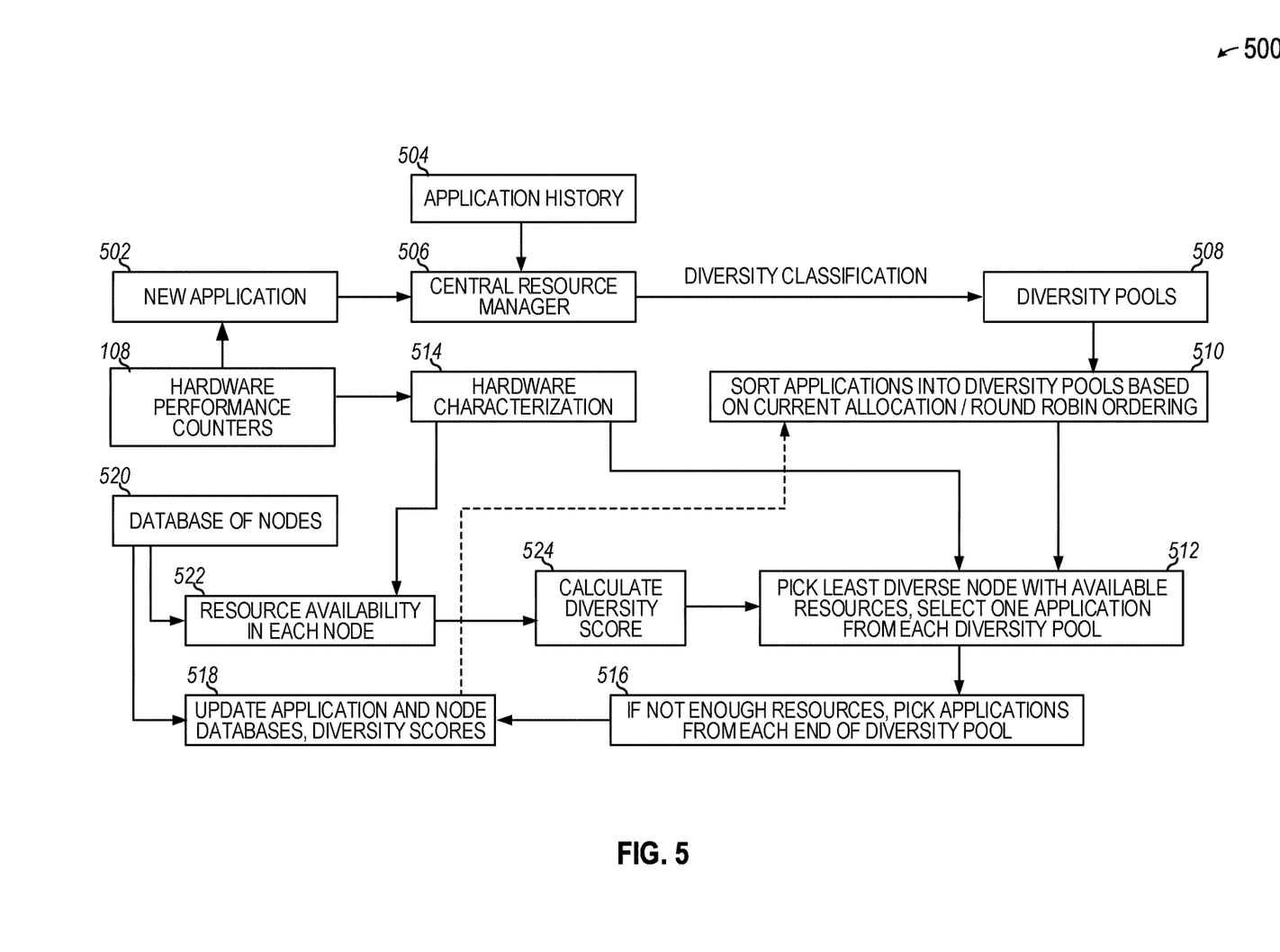
FIG. 5 illustrates a flow chart of a diversity resource management algorithm in accordance with a sample embodiment.

FIG. 5 illustrates a flow chart of a diversity resource management algorithm 500 for implementation by the resource manager 102 (FIG. 1) in accordance with a sample embodiment. The task of the diversity resource management algorithm 500 is to identify performance critical characteristics by overlapping application hardware resource usage with the capability of the respective nodes 106 (e.g., machines) available for application allocation. The applications 100 are added to appropriate diversity pools based on the critical hardware use. In FIG. 5, the hardware resource usage of a new application 100 is monitored in real time by a hardware performance counter 108 at 502 or the hardware resource usage metric gathered offline for the application 100 is provided as application history 504 to the central resource manager 506 to establish the diversity classification of the application (e.g., the hardware resource bound characteristic of the application) for assignment of the application 100 to a diversity pool 508. The applications 100 are sorted into diversity pools 508 at 510 based on the current allocation (if the application 100 is already running on a node 106) or is assigned to a node 106 using a fairness algorithm, such as a round-robin routine, lowest allocation first algorithm, dominant resource fairness algorithm, etc., to sort the applications 100 in terms of eligibility of the measured low-level resources 100.

Once the applications 100 are sorted into diversity pools 508 at 510, the most eligible applications from different diversity pools 508 are chosen for each node 106 at 512. The hardware characteristics 514 of the respective nodes 106 available for application assignment within the cluster 104 as well as the diversity scores of the respective nodes 106 are provided as input to the application assignment step 512. As noted above, the hardware characteristics 514 may be determined using micro-benchmarking techniques to identify each machine hardware's maximum usage level for a certain resource. Generally, the goal is to pick the least diverse node 106 based on diversity score that has hardware resources available and to select an application 100 from the diversity pool 508 that is bound by that hardware resource but is not expected to saturate that hardware resource based on the measured usage metrics for the hardware resource by the application 100 to be assigned. If not enough hardware resources are available to assign the application 100, the applications 100 are selected at 516 from each end of the diversity pools 508 to select the applications 100 using the most or the least of the respective resources, as appropriate. Limits of excess resource allocations compared to other applications (low eligibility for resources) prevents unfair allocations and ensures fairness. However, certain combinations of diversity (CPU+Mem+Disk) can be selectively preferred over others (CPU+L2 cache+L3 cache) in this process to further reduce interference. If applications from different diversity pools 508 do not exist or are not eligible, the most eligible applications 100 based on resource usage metrics are selected.

Once the application 100 has been assigned to maximize diversity of usage of low-level hardware resources based on the usage characteristics of the application 100 as compared to the hardware resources available on the respective nodes 106, the application 100 and node databases 520 are updated at 518 to reflect the diversity score for the node 106 to which the application 100 has been assigned. From updated application usage metrics and diversity scores provided in the updated node database 520 and the hardware characterization 514 of the respective nodes 106, the diversity resource management algorithm 500 determines at 522 the resource available for assignment at each node 106. The diversity score for each node 106 in the cluster 104 is then calculated at 524. The diversity score is a function of the hardware characteristics 514 and the monitored usage metrics for the respective applications 100 assigned to the respective nodes 106. The updated diversity score is provided as a further input to the node selection step 512 for identification of the least diverse node for which application assignments are still available based on existing hardware usage. The diversity score for a node after assignment of an application 100 may also be fed back as input to the fairness algorithm at 510 to assist in the sorting of applications into diversity pools 508. The process illustrated in FIG. 5 repeats so long as there are applications 100 available for assignment.

Thus, unlike traditional resource application systems that do not identify saturation in performance because they are not application characteristic aware, the systems and methods described herein identify saturation in performance and assign applications to maximize performance whereby such performance bounds are avoided as possible. Additionally, since different hardware machines saturate at different stress levels, the machine characteristics are similarly monitored to improve the efficiency of the application assignments to the respective nodes. Using such an approach, a performance improvement of more than 60% has been measure for nodes executing a variety of applications. It will be appreciated by those skilled in the art that mostly CPU bound applications also have room for improvement by increasing resource utilization using the techniques described herein.

Those skilled in the art will appreciate that the techniques described herein may be used to prioritize applications differently, to characterize hardware differently, and to change fairness guarantees, and the like, so long as the overall approach of increasing diversity of hardware usage is maintained. Of course, the techniques described herein need not be used exclusively but may complement traditional resource management systems that allocate resources based on usage of high level system elements such as CPU cycles and memory access cycles. It will also be appreciated that the techniques described herein can reduce energy costs and increase performance at the same time by intelligently packing applications together to, for example, maximize usage of low-level elements based on energy usage.

Those skilled in the art also will appreciate that the techniques described herein are particularly useful for use in private clouds and applications since the company or individuals maintaining the private cloud has knowledge and control to experimentally run different applications together and observe compatibility. However, the techniques described herein work for both public and private clouds without manual experimentation/expertise by monitoring and measuring the hardware usage metrics of new applications in real time or offline as described herein. The systems and methods described herein thus function to increase resource utilization of clusters and data centers, to reduce average latency for application execution, and to improve energy and cost savings since time spent per application is reduced.

Figure 6:
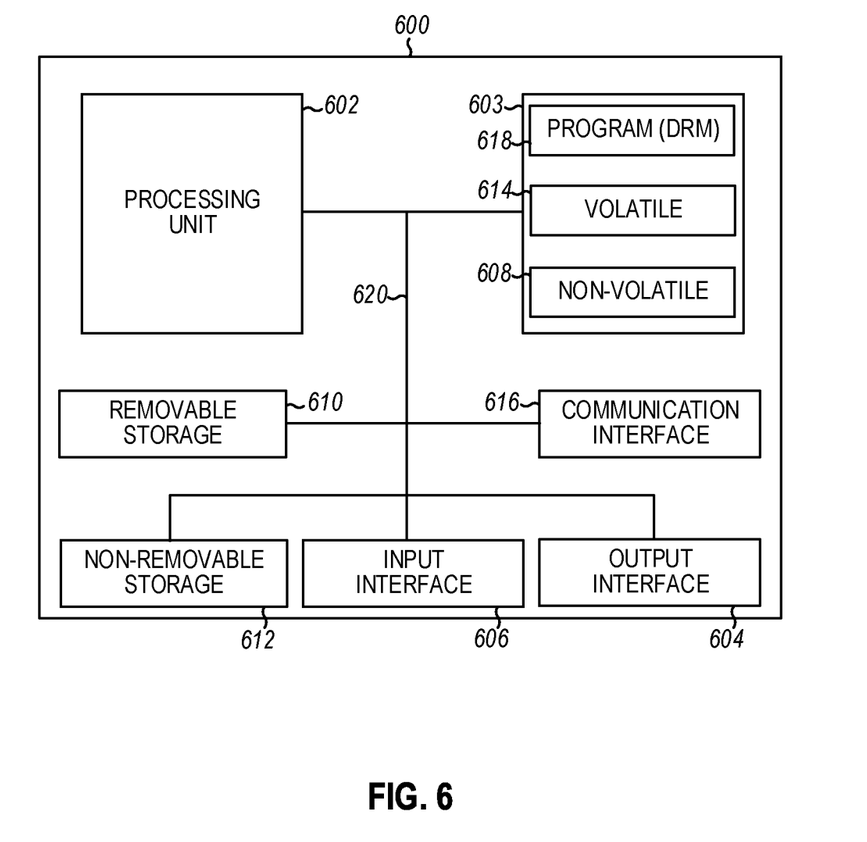
FIG. 6 illustrates a typical, general-purpose network component suitable for implementing one or more embodiments of the apparatus, methods, and computer-readable storage media disclosed herein.

FIG. 6 is a block diagram illustrating circuitry in the form of a processing system for implementing systems and methods of providing diversity resource management in a cluster of host computers as described above with respect to FIGS. 1-5 according to sample embodiments. All components need not be used in various embodiments. One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, or other computing device including the same or similar elements as illustrated and described with regard to FIG. 6. Devices, such as smartphones, tablets, and smartwatches, are generally collectively referred to as mobile devices or user equipment. Further, although the various data storage elements are illustrated as part of the computer 600, the storage may also or alternatively include cloud-based storage accessible via a network, such as the Internet or server-based storage.

Memory 603 may include volatile memory 614 and non-volatile memory 608. Computer 600 also may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer 600 may operate in a networked environment using a communication connection to connect to one or more remote computers, which may include a personal computer (PC), server, router, network PC, a peer device or other common DFD network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software that, upon execution by the processing unit 602, performs the diversity resource management operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed to be transitory. Storage can also include networked storage, such as a storage area network (SAN). Computer program 618 also may include instruction modules that upon processing cause processing unit 602 to perform one or more methods or algorithms described herein.

In an example embodiment, the computer 600 includes a usage determination module determining usage of respective hardware resources by an application to generate usage metrics, and a cluster assignment module assigning the application to a cluster of hardware resources to optimize diversity of usage of the hardware resources in the cluster and to enhance utilization of hardware resources by applications running in that cluster, wherein diversity of usage of the hardware resources in the cluster is determined from respective usage metrics of the respective applications running in that cluster. In some embodiments, the computer 600 may include other or additional modules for performing any one of or combination of steps described in the embodiments. Further, any of the additional or alternative embodiments or aspects of the method, as shown in any of the figures or recited in any of the claims, are also contemplated to include similar modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above with reference to any one or all of steps of the disclosure can be installed in and sold with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled," and variations thereof are not restricted to physical or mechanical connections or couplings.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code, or instructions to perform functions (e.g., by operating on input data and/or generating an output). Method steps can also be performed by, and apparatus for performing the methods can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors 602, such that the instructions, upon execution by one or more processors 602 cause the one or more processors 602 to perform any one or more of the methodologies described herein. Accordingly, a "machine-readable medium" refers to a single storage apparatus or device, as well as "cloud-based" storage systems that include multiple storage apparatus or devices.

Those skilled in the art will appreciate that while sample embodiments have been described in connection with methods of providing diversity resource management when assigning applications to nodes (machines) in a hardware cluster in a sample embodiment, the disclosure described herein is not so limited. For example, the techniques described herein may be used to allocate applications across virtual machines. The techniques described herein also may be used to assign software to multiple nodes whereby multiple instances of an application run on multiple threads across different machines. In such embodiments, the hardware resources may be used differently by the different applications on different machines.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A computer-implemented method of distributed resource management in a distributed computing system, comprising:
    determining usage of low-level hardware resources by an application and generating usage metrics for the application;
    identifying a preferred subset of the low-level hardware resources in a cluster of hardware resources, the preferred subset identified based on low-level hardware diversity that reduces interference among the low-level hardware resources;
    determining hardware characteristics of a plurality of hardware resource nodes within the cluster of hardware resources;
    generating a plurality of hardware resource node diversity scores based on the hardware characteristics, each of the plurality of hardware resource node diversity scores indicating a hardware node low-level resource diversity;

selecting a least diverse hardware resource node from among the plurality of hardware resource nodes based on the plurality of hardware resource node diversity scores, the least diverse hardware resource node associated with a lowest number of different low-level hardware resource types; and assigning the application to the least diverse hardware resource node to optimize a diversity of usage of the preferred subset of the low-level hardware resources in the cluster of hardware resources and to enhance utilization of hardware resources by applications running in the cluster of hardware resources, the diversity of usage of the low-level hardware resources in the cluster of hardware resources being determined from usage metrics of the applications running in the cluster of hardware resources.

2. The method of claim 1, wherein the determining of the usage of the low-level hardware resources by the application comprises using a hardware performance counter to determine at least one of a cache coherence, a memory bandwidth, a multi-level cache performance, a processor bus performance, a processor pipeline performance, a cache bandwidth, a cache hit rate, or non-uniform memory access latencies, the hardware performance counter including a set of special-purpose registers built into a microprocessor.

3. The method of claim 1, wherein the determining of the usage of low-level hardware resources by the application to determine the usage metrics is performed when the application is running offline.

4. The method of claim 1, wherein the determining of the usage of hardware resources by the application to determine the usage metrics is performed in real time as the application is being executed by the low-level hardware resources.

5. The method of claim 1, further comprising characterizing the low-level hardware resources using micro-benchmarking to identify performance-critical hardware resources.

6. The method of claim 1, wherein the assigning of the application to the cluster of hardware resources to optimize the diversity of usage of the low-level hardware resources in the cluster of hardware resources comprises:

extrapolating hardware resources required by the application to a capability of each hardware resource; and assigning the application to a diversity pool of hardware resources based on a fairness algorithm to maximize the diversity of usage of the low-level hardware resources in the diversity pool based on the usage metrics.

7. The method of claim 6, wherein the assigning of the application to the cluster of hardware resources to optimize the diversity of usage of the low-level hardware resources in the cluster of hardware resources comprises sorting the application and other applications into diversity pools of hardware resources using the fairness algorithm.

8. The method of claim 1, wherein the assigning of the application to the cluster of hardware resources to optimize the diversity of usage of the low-level hardware resources in the cluster of hardware resources comprises:

assigning the application to a diversity pool of hardware resources adapted to minimize interference when applications assigned to the diversity pool of hardware resources access the low-level hardware resources in the diversity pool; and assigning applications from different diversity pools to the cluster of hardware resources.

9. The method of claim 1, wherein the assigning of the application to the cluster of hardware resources to optimize the diversity of usage of the low-level hardware resources in the cluster of hardware resources comprises:

selecting a least diverse cluster of hardware resources; and assigning applications from respective diversity pools to the least diverse cluster of hardware resources for processing.

10. An apparatus for providing distributed resource management in a distributed computing system, comprising:

at least one hardware performance counter that generates usage metrics for low-level hardware resources used by an application;

a memory storing instructions; and at least one processor in communication with the memory, the at least one processor configured, upon execution of the instructions, to act as a resource manager and perform the following steps:

identifies a preferred subset of the low-level hardware resources in a cluster of hardware resources, the preferred subset identified based on low-level hardware diversity that reduces interference among the low-level hardware resources;

determines hardware characteristics of a plurality of hardware resource nodes within the cluster of hardware resources;

generates a plurality of hardware resource node diversity scores based on the hardware characteristics, each of the plurality of hardware resource node diversity scores indicating a hardware node low-level resource diversity;

selects a least diverse hardware resource node from among the plurality of hardware resource nodes based on the plurality of hardware resource node diversity scores, the least diverse hardware resource node associated with a lowest number of different low-level hardware resource types; and assigns the application to the least diverse hardware resource node based on the usage metrics to optimize a diversity of usage of the preferred subset of the low-level hardware resources in the cluster of hardware resources and to enhance utilization of the low-level hardware resources by applications running in the cluster of hardware resources, the diversity of usage of the low-level hardware resources in the cluster of hardware resources being determined from usage metrics of the applications running in the cluster of hardware resources.

11. The apparatus of claim 10, wherein the at least one hardware performance counter determines the usage metrics for the application when the application is running offline.

12. The apparatus of claim 10, wherein the at least one hardware performance counter determines the usage metrics for the application in real time as the application is being executed by the low-level hardware resources.

13. The apparatus of claim 10, further comprising a micro-benchmarking application that is run on a node including the low-level hardware resources to identify performance critical hardware resources of the node.

14. The apparatus of claim 10, wherein the at least one manager further executes the instructions to:

assigns the application to the cluster of hardware resources to optimize the diversity of usage of the low-level hardware resources in the cluster of hardware resources by extrapolating hardware resources required by the application to a capability of each hardware resource; and assigns the application to a diversity pool of hardware resources based on a fairness algorithm to maximize the diversity of usage of the low-level hardware resources in the diversity pool based on the usage metrics.

15. The apparatus of claim 14, wherein the at least one manager further executes the instructions to assign the application to the cluster of hardware resources to optimize the diversity of usage of the low-level hardware resources in the cluster of hardware resources by sorting the application and other applications into diversity pools of hardware resources using the fairness algorithm.

16. The apparatus of claim 10, wherein the at least one manager further executes the instructions to:
assigns the application to the cluster of hardware resources to optimize the diversity of usage of the low-level hardware resources in the cluster of hardware resources by assigning the application to a diversity pool of hardware resources adapted to minimize interference when applications assigned to the diversity pool of hardware resources access the low-level hardware resources in the diversity pool; and
assigns applications from different diversity pools to the cluster of hardware resources.

17. The apparatus of claim 10, wherein the at least one manager further executes the instructions to:
assigns the application to the cluster of hardware resources to optimize the diversity of usage of the low-level hardware resources in the cluster of hardware resources by selecting a least diverse cluster of hardware resources; and
assigns applications from respective diversity pools to the least diverse cluster of hardware resources for processing.

18. A non-transitory computer-readable medium storing computer instructions to provide distributed resource management in a distributed computing system, that when executed by one or more processors, cause the one or more processors to perform the steps of:
determining usage of low-level hardware resources by an application and generating usage metrics for the application;
identifying a preferred subset of the low-level hardware resources in a cluster of hardware resources, the preferred subset identified based on low-level hardware diversity that reduces interference among the low-level hardware resources;
determining hardware characteristics of a plurality of hardware resource nodes within the cluster of hardware resources;
generating a plurality of hardware resource node diversity scores based on the hardware characteristics, each of the plurality of hardware resource node diversity scores indicating a hardware node low-level resource diversity;
selecting a least diverse hardware resource node from among the plurality of hardware resource nodes based on the plurality of hardware resource node diversity scores, the least diverse hardware resource node associated with a lowest number of different low-level hardware resource types; and
assigning the application to the least diverse hardware resource node based on the usage metrics to optimize a diversity of usage of the preferred subset of the low-level hardware resources in the cluster of hardware resources and to enhance utilization of hardware resources by applications running in the cluster of hardware resources, the diversity of usage of the low-level hardware resources in the cluster of hardware resources being determined from usage metrics of the applications running in the cluster of hardware resources.

19. The non-transitory computer-readable medium of claim 18, wherein the determining of the usage of the low-level hardware resources by the application comprises using a hardware performance counter to determine at least one of a cache coherence, a memory bandwidth, a multi-level cache performance, a processor bus performance, a processor pipeline performance, a cache bandwidth, a cache hit rate, or a non-uniform memory access latencies, the hardware performance counter including a set of special-purpose registers built into a microprocessor.

20. The non-transitory computer-readable medium of claim 18,
wherein the determining of the usage of the low-level hardware resources by the application to determine the usage metrics is performed when the application is running offline.

* * * * *